Sept. 5, 1933.  H. E. RIDGE  1,925,461

VEHICLE BUMPER

Filed May 11, 1932  2 Sheets-Sheet 1

Inventor

H. E. Ridge

By Clarence A. O'Brien
Attorney

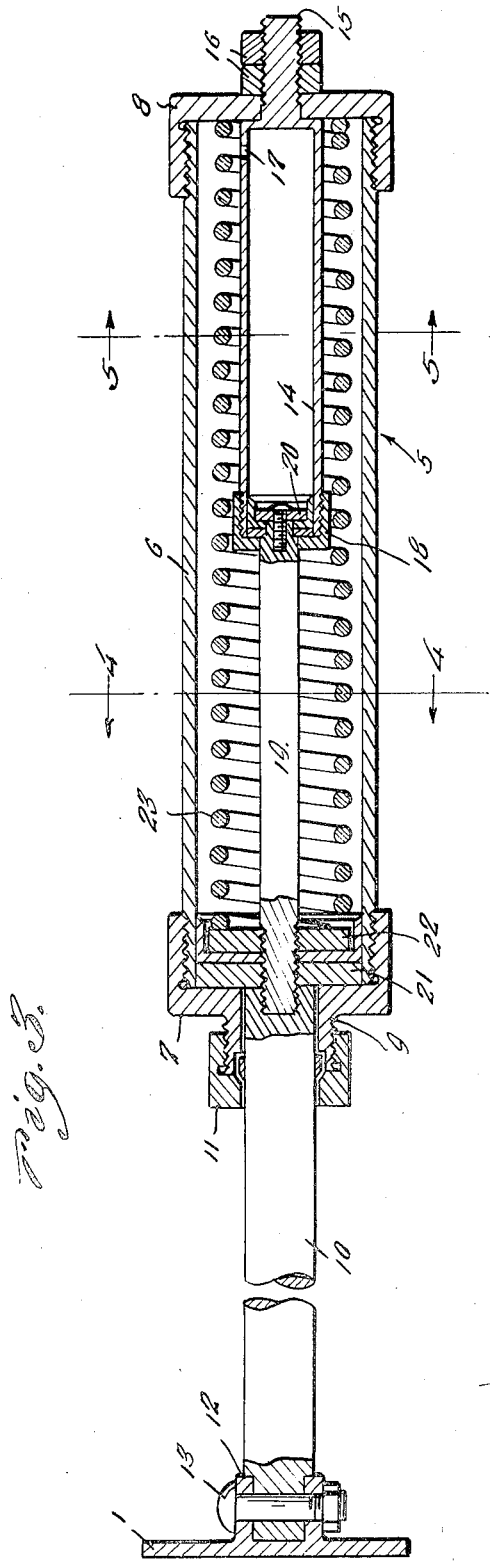
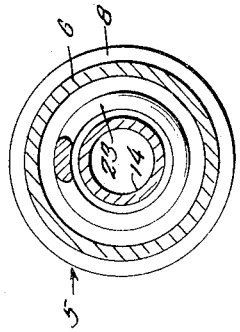
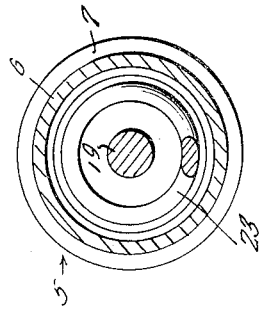

Patented Sept. 5, 1933

1,925,461

UNITED STATES PATENT OFFICE 1,925,461

VEHICLE BUMPER

Hayes E. Ridge, Cedar Rapids, Iowa

Application May 11, 1932. Serial No. 610,642

4 Claims. (Cl. 293—55)

The present invention relates to new and useful improvements in vehicle bumpers and has for its primary object to provide, in a manner as hereinafter set forth, a bumper having resilient mounting means through the medium of which transmission of shock to the vehicle will be substantially eliminated or materially reduced.

Other objects of the invention are to provide a vehicle bumper of the aforementioned character which will be simple in construction, strong, durable, efficient and reliable in use, compact, attractive in appearance and which may be manufactured and installed at low cost.

All of the foregoing and still further objects and advantages of the invention will become apparent from a study of the following specification, taken in connection with the accompanying drawings, wherein like characters of reference designate corresponding parts throughout the several views, and wherein:—

Figure 3 is a view principally in vertical longitudinal section through the bumper.

Figure 4 is a view in vertical transverse section, taken substantially on the line 4—4 of Figure 3 and looking in the direction indicated by the arrows.

Figure 5 is a view in vertical transverse section, taken substantially on the line 5—5 of Figure 3 and looking in the direction indicated by the arrows.

Figure 1:
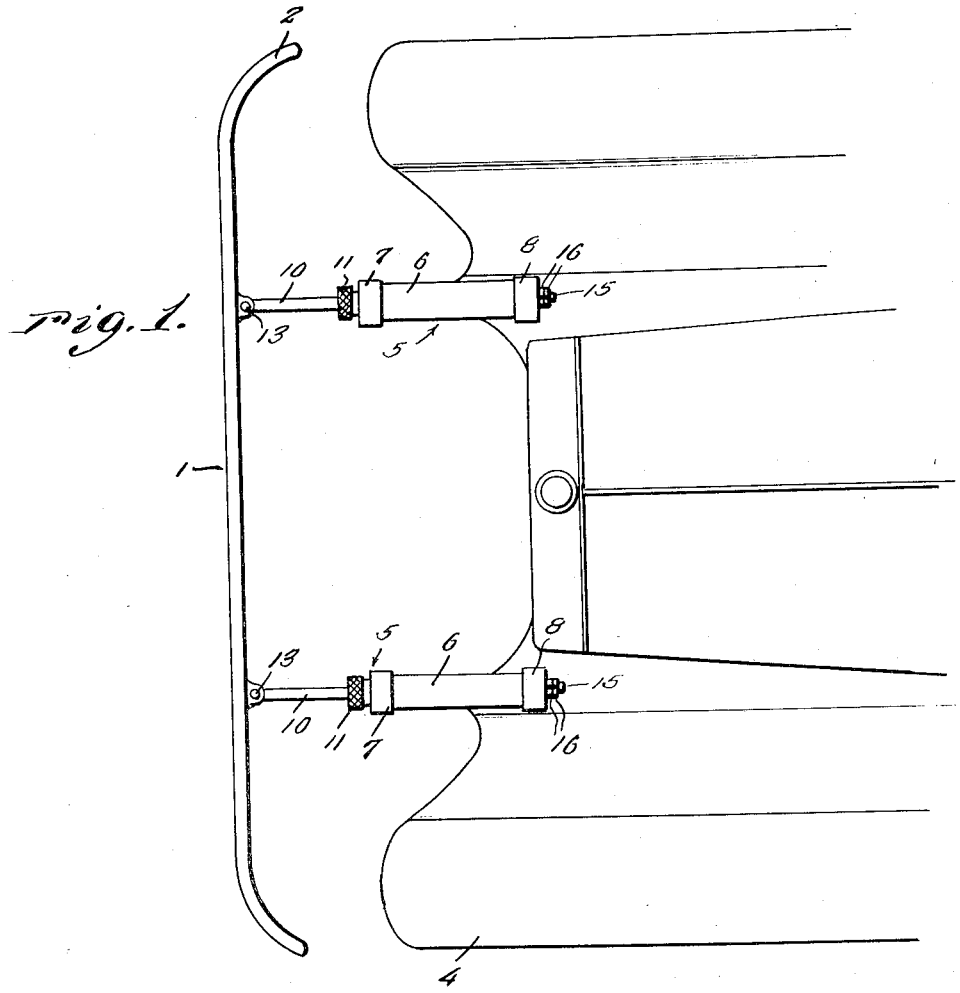
Figure 1 is a view in top plan showing a bumper in accordance with the present invention mounted on a vehicle.
Figure 2:
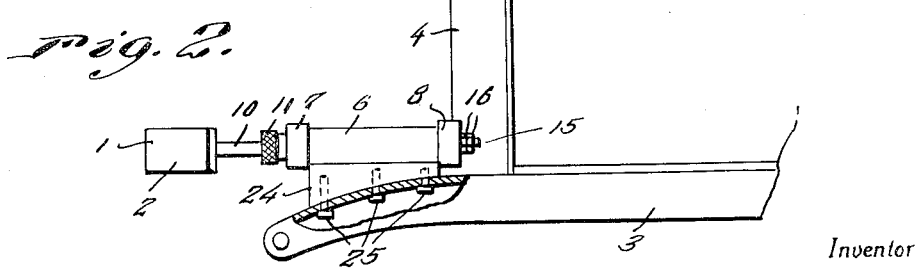
Figure 2 is a view in side elevation thereof, showing a portion of the vehicle frame broken away in section to disclose the bumper securing bolts.

Referring now to the drawings in detail, it will be seen that the embodiment of the present invention which has been illustrated comprises a bar 1 of suitable metal having the rearwardly curved end portions 2. The bar 1 is mounted in position for use on the forward end portion of the frame 3 of an automobile 4 or other vehicle through the medium of a pair of resilient supporting members which are designated generally by the reference numeral 5. As the supporting members 5 are identical in construction, a detailed description of one will suffice for both.

Each supporting member 5 comprises, as illustrated to advantage in Figure 3 of the drawings, a horizontally extending elongated cylinder 6 having externally threaded end portions receiving the caps 7 and 8. Projecting forwardly from the cap 7 is an externally threaded neck 9 through which a rod 10 extends slidably into the cylinder 6. A packing 11 is provided on the neck 9 for the rod 10. The forward end portion of the rod 10 is secured between ears 12 which depend rearwardly from the bumper bar 1 by the bolts 13.

An inner cylinder 14 is mounted on the cap 8 in the outer cylinder 6 in spaced, concentric relation to said outer cylinder through the medium of a threaded shank 15 which projects through an opening provided therefor in said cap 8, upon which shank securing nuts 16 are threaded. The cylinder 14 communicates with the cylinder 6 through a port 17 in the rear end portion of said cylinder 14. The cylinder 14 is provided with an externally threaded forward end portion upon which is mounted a cap 18.

A rod 19 extends slidably through an opening provided therefor in the cap 18 into the inner cylinder 14 and has secured on its rear end for reciprocation in said cylinder 14, a piston 20. The forward end portion of the rod 19 is threaded and engaged in a socket provided therefor in the rear end portion of the rod 10, thus connecting said rod 10 and the rod 19 together. A piston 21 is mounted on the forward end portion of the rod 19 in abutting engagement with the rear end of the rod 10 and secured thereagainst by a disk 22 which is threadedly mounted on the rod 19. The piston 21 is slidable in the outer cylinder 6. A coil spring 23 is mounted longitudinally in the outer cylinder 6, said coil spring encircling the rod 19 and the inner cylinder 14 and having its rear end engaged against the cap 8 and its forward end engaged with the disk 22 for yieldingly urging the pistons 20 and 21 forwardly in their respective cylinders, together with the rods 10 and 19.

The cylinders 6 may be mounted on the frame 3 of the vehicle 4 through the medium of a metallic block 24 depending from said cylinder 6 and shaped to conform to the downwardly curved forward end portion of said frame 3. Holes are drilled in the frame 3 for the passage of securing bolts 25 which are threaded into sockets provided therefor in the block 24.

In use, when the bumper bar 1 strikes an object, the rod 10 is driven rearwardly in the outer cylinder 6, thus driving the pistons 21 and 20 rearwardly in their respective cylinders and compressing the air or other fluid in said cylinders. The piston 21, of course, is driven rearwardly also against the tension of the coil spring 23. As the pistons are driven rearwardly, the air passes through the port 17 until the pressure in the inner and outer cylinders is equalized. After the impact, or when the bumper bar 1 is released, the coil spring 23 returns the ports to their former positions.

It is believed that the many advantages of a bumper constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A vehicle bumper comprising a bar, cylinders mounted on the vehicle, rods connected to the bar and extending slidably into the cylinders through one end thereof, inner cylinders mounted in the first named cylinders, rods connected to the first named rods in the first named cylinders and extending slidably into the inner cylinders, pistons mounted on the second named rods and slidable in the inner cylinders, comparatively large pistons mounted on the second named rods and slidable in the first named cylinders, the inner cylinders having ports therein communicating with the first named cylinders, and coil springs in the first named cylinders engaged with the second named pistons for yieldingly urging the rods forwardly in said first named cylinders.

2. A vehicle bumper comprising a bar, and means for mounting the bar on the vehicle, said means including an outer cylinder attached to the vehicle, an inner cylinder mounted in the outer cylinder and having a port therein communicating with said outer cylinder, comparatively large and small pistons mounted for reciprocation in the outer and inner cylinders, respectively, means connecting the bar with the pistons, and coil springs mounted in the outer cylinder for yieldingly urging the bar forwardly.

3. A vehicle bumper comprising a bar, and means for mounting said bar on the vehicle, said means including an outer cylinder attached to the vehicle, caps threaded on the ends of the outer cylinder, an inner cylinder mounted in one end portion of the outer cylinder in spaced, concentric relation thereto, a threaded shank on the inner cylinder projecting through one of the caps for mounting said inner cylinder thereon, nuts threaded on the shank for securing the inner cylinder on said one cap, said inner cylinder having ports therein communicating with the outer cylinder, a rod connected to the bar and extending slidably through the other cap into the outer cylinder, a rod threadedly connected with the first named rod in the outer cylinder and extending slidably into the inner cylinder, a piston mounted on one end of the second named rod for reciprocation in the inner cylinder, a comparatively large piston mounted on the other end portion of the second named rod for reciprocation in the outer cylinder, and a coil spring mounted in the outer cylinder and encircling the second named rod and the inner cylinder and having one end engaged with said one cap and its other end engaged with the second named piston for yieldingly urging the bar forwardly.

4. A vehicle bumper comprising a bar, and means for mounting the bar on the vehicle, said means including inner and outer cylinders communicating with each other, pistons operable in the cylinders, rods connecting the bar to the pistons, and resilient means for yieldingly urging the rods in one direction.

HAYES E. RIDGE.